May 19, 1970  J. D. MILLER  3,512,548
MOVABLE IRRIGATION PIPELINE SYSTEM
Filed June 16, 1967  6 Sheets-Sheet 1
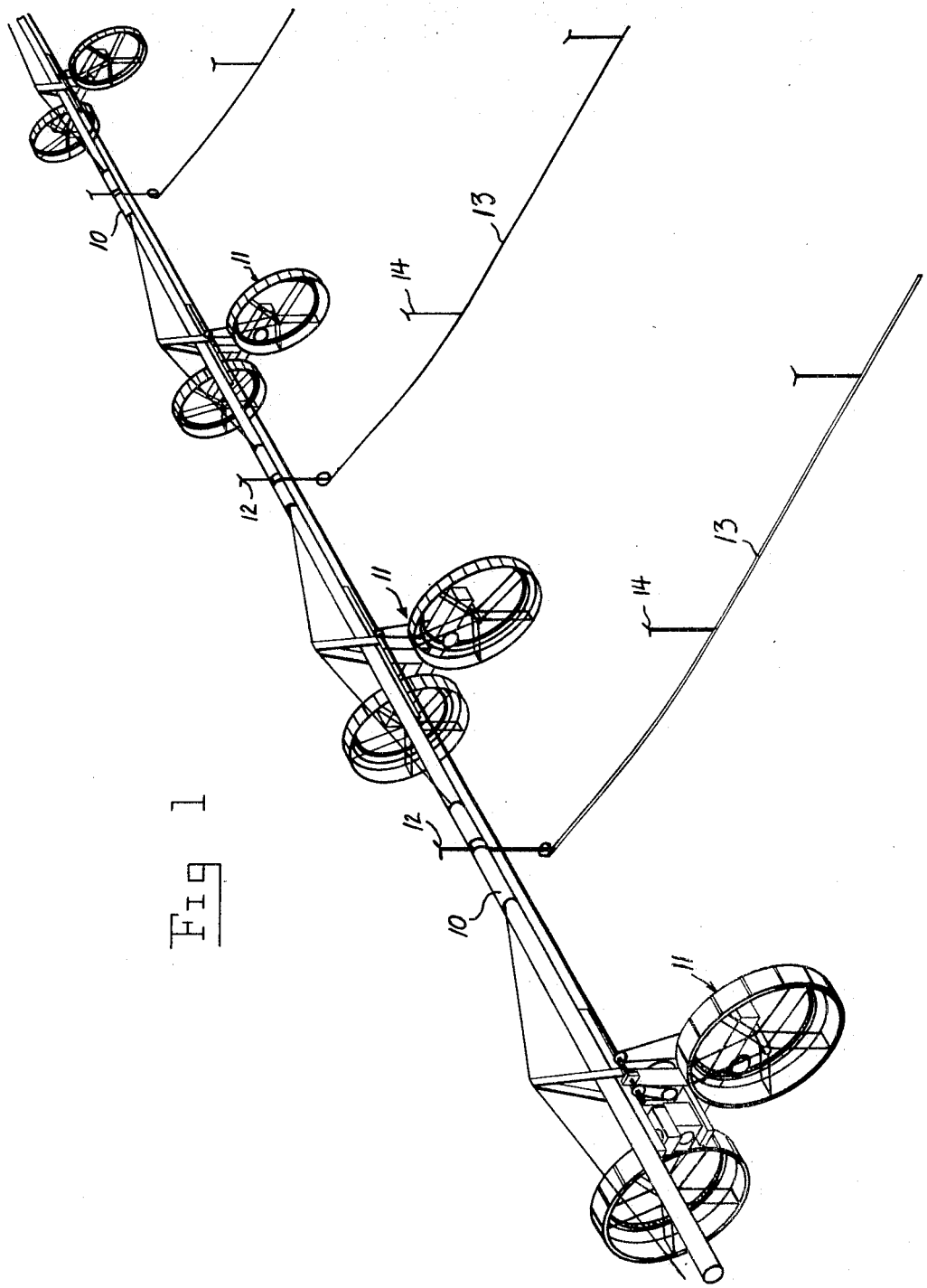
INVENTOR.
JOHN D. MILLER
BY
Wells & St. John
ATTYS.

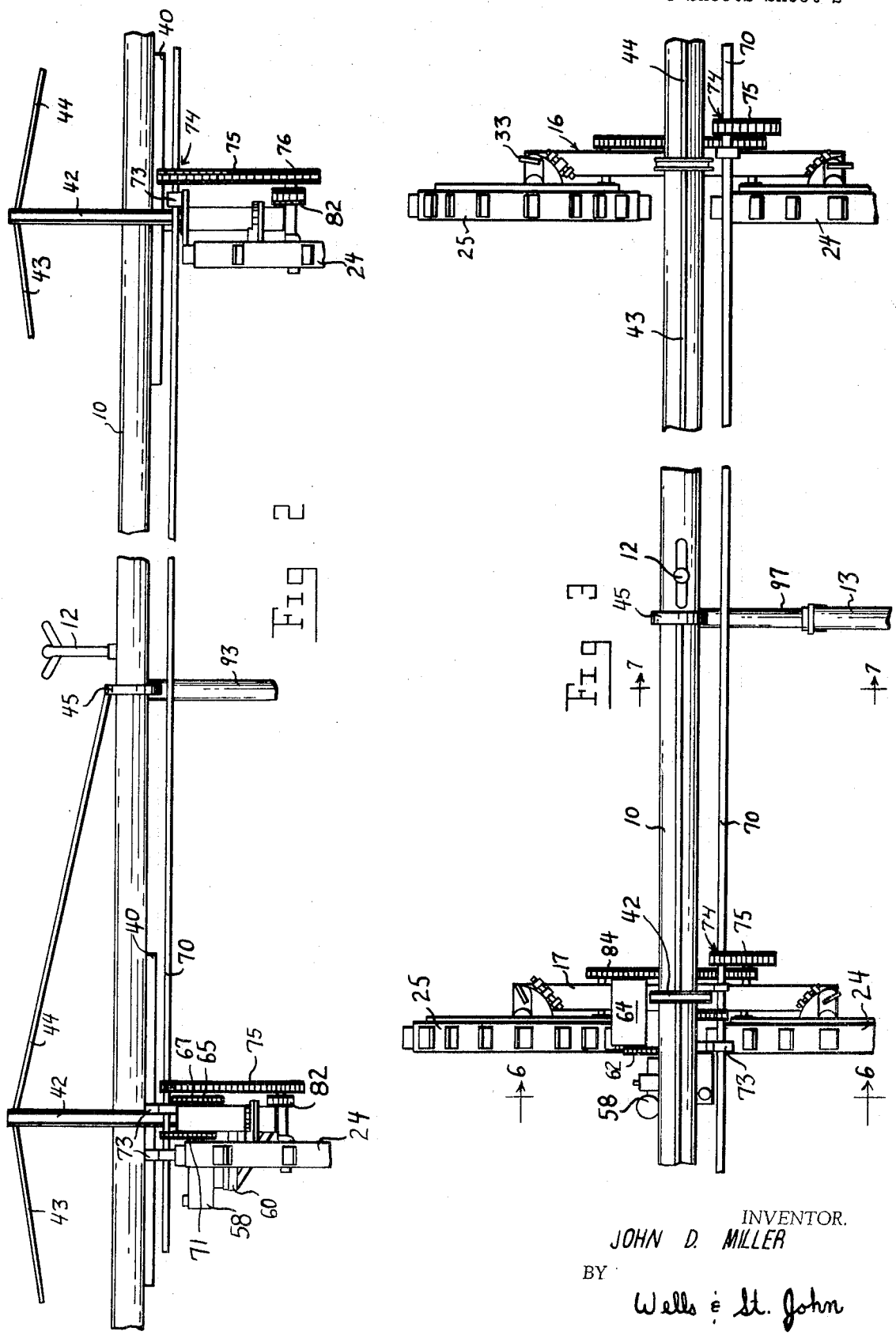

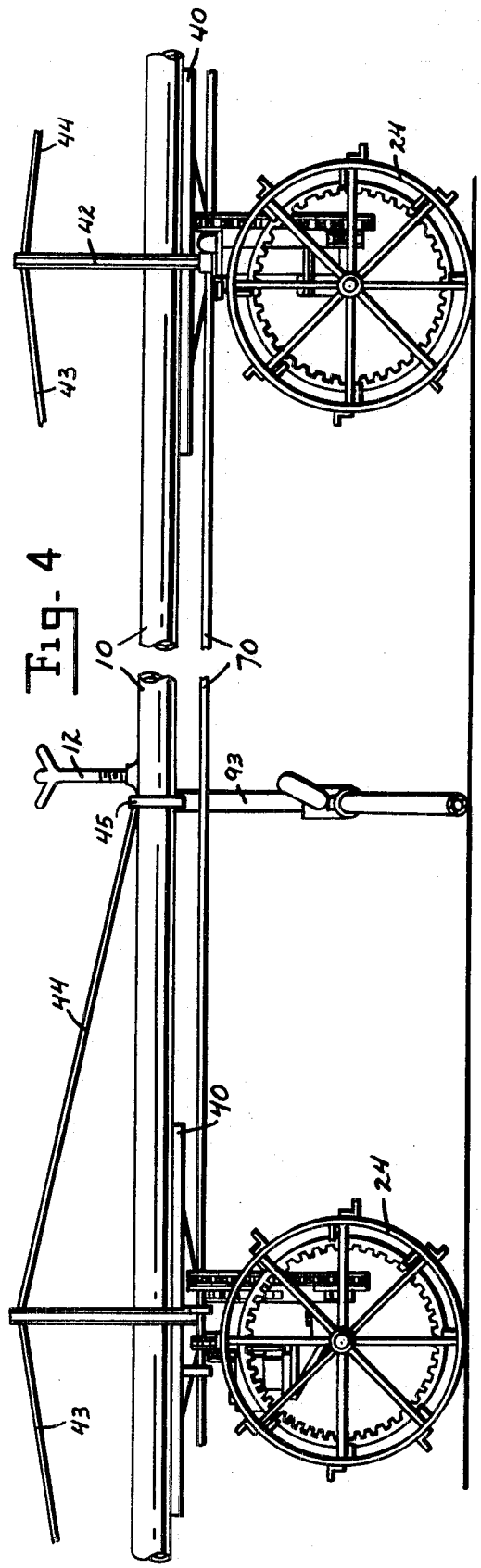
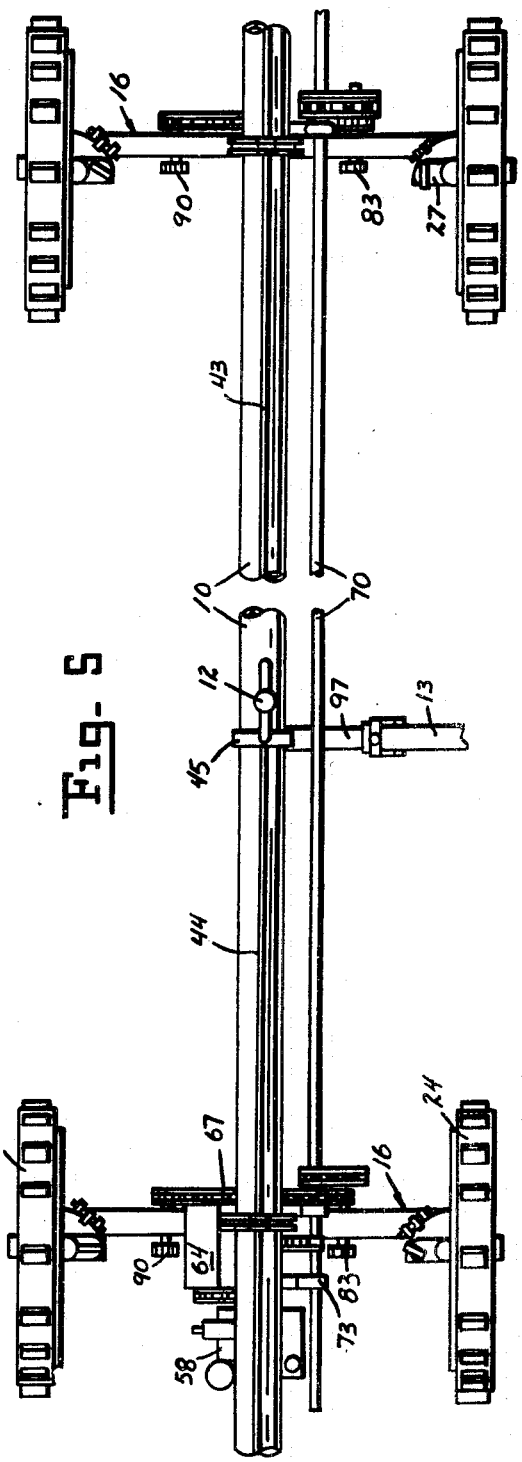

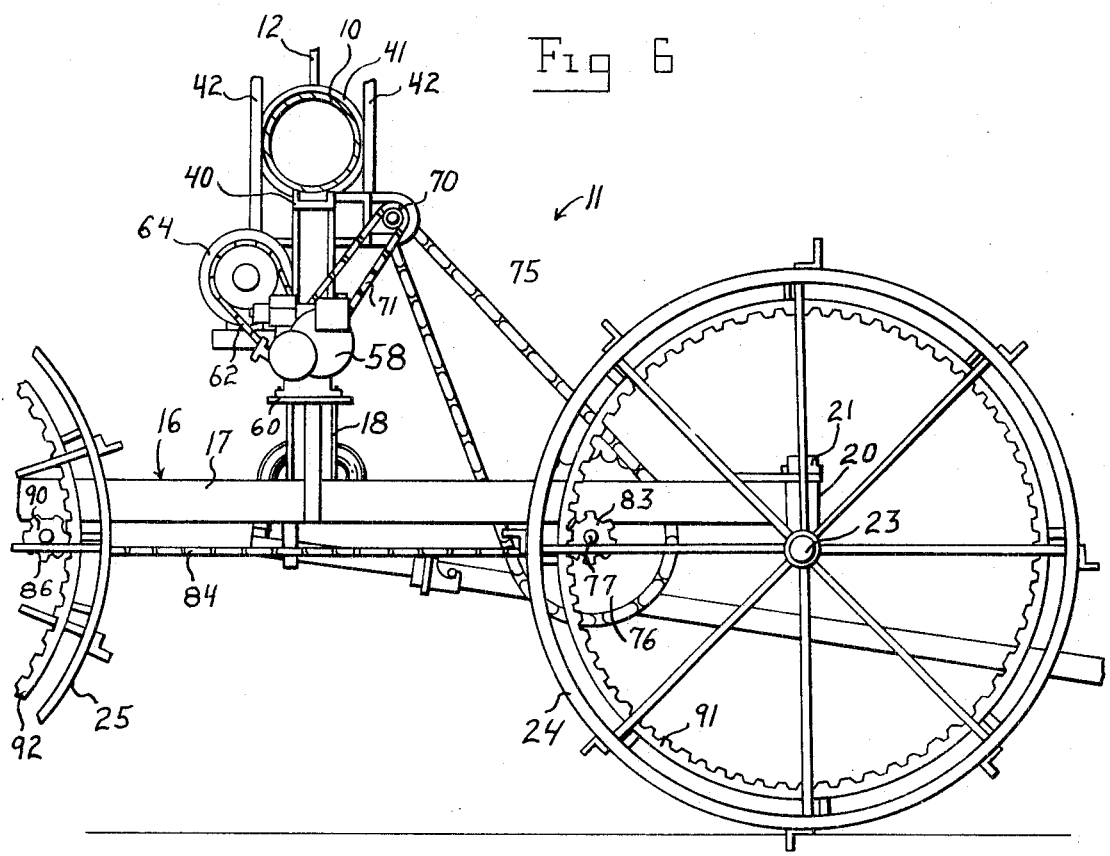
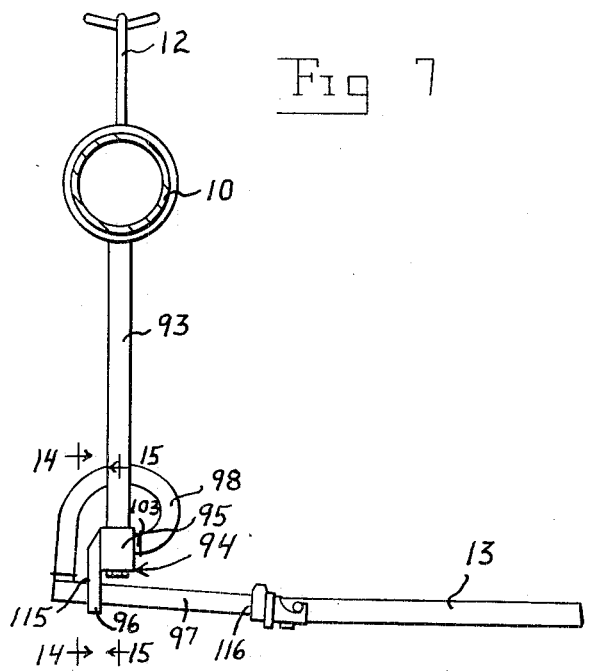

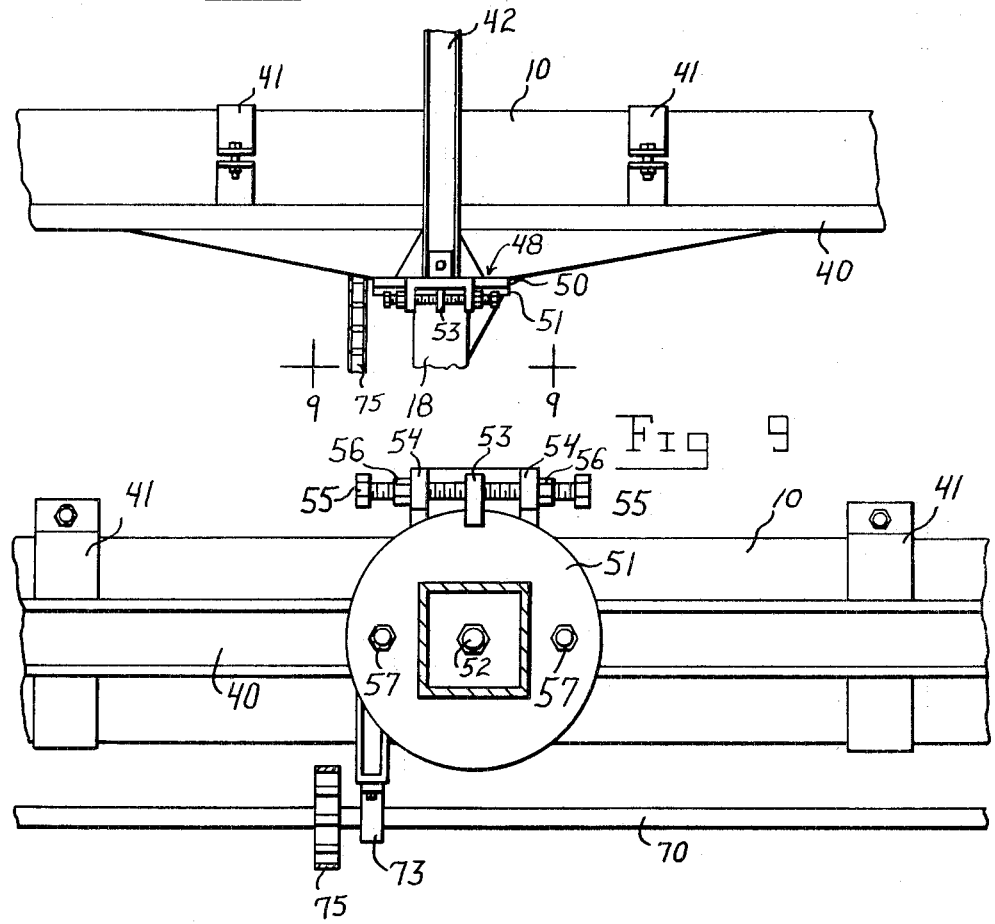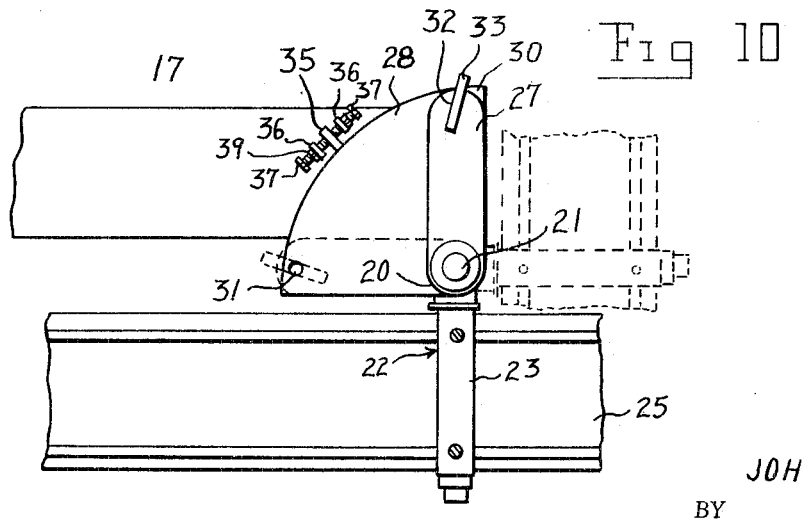

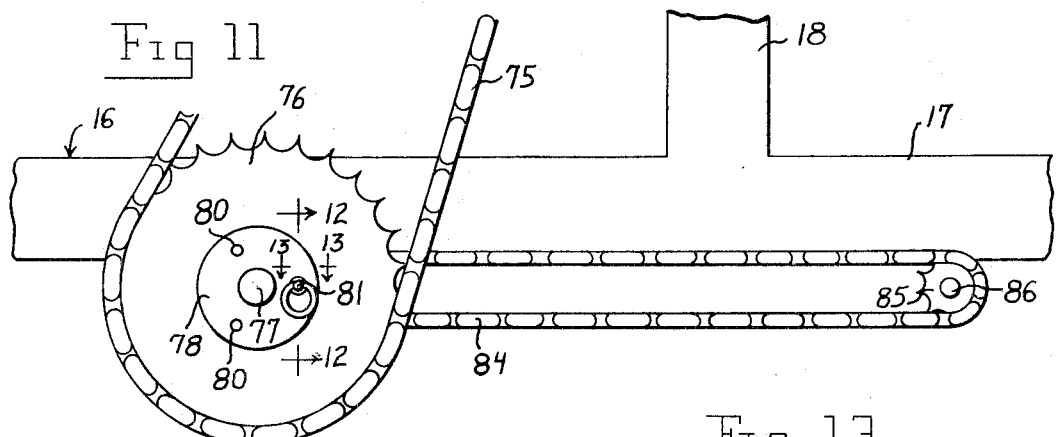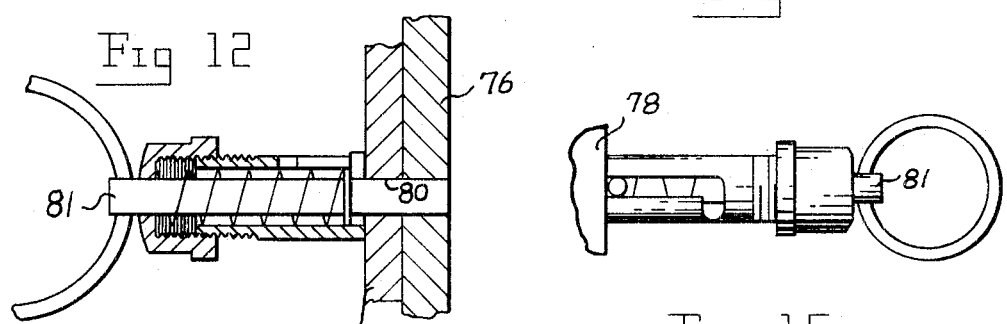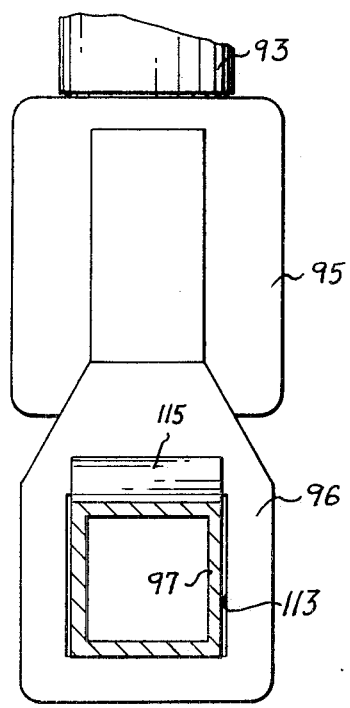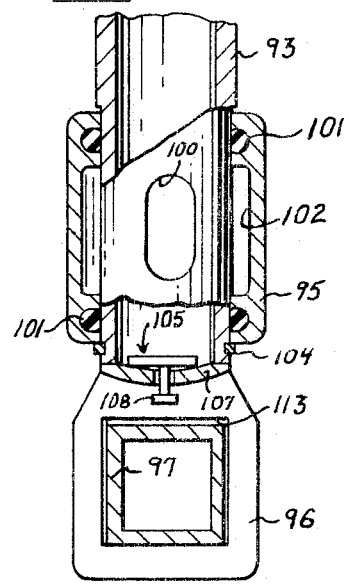

United States Patent Office

3,512,548
Patented May 19, 1970

---

3,512,548
MOVABLE IRRIGATION PIPELINE SYSTEM
John D. Miller, Greenacres, Wash., assignor to Anderson-Miller Mfg. Co., Spokane, Wash., a corporation of Washington
Filed June 16, 1967, Ser. No. 651,934
Int. Cl. B05b 9/02; E01h 3/02
U.S. Cl. 137—344                                    14 Claims

ABSTRACT OF THE DISCLOSURE

The disclosure describes a movable irrigation pipeline apparatus having a plurality of transverse vehicles along the main pipeline for supporting and transversely moving a nonrotatable pipeline 10. The wheels are pivotally mounted at the ends of the vehicle frames for enabling longitudinal as well as transverse movement. Drive pinions are positioned on the frames spaced from the pivot axes of the wheels for meshing with internal spur gears, affixed to the wheels, only when the wheels are transversely positioned. Fine adjustment features are incorporated to accurately position the vehicles with respect to the pipeline. Secondary lines are connected to the main pipeline through expandable couplings for permitting the secondary line to swing in a horizontal plane but preventing the rotation of the secondary lines about their longitudinal axes.

BACKGROUND OF THE INVENTION

This invention relates to movable irrigation pipelines and more particularly to nonrotatable pipelines having transverse vehicles spaced along the pipeline for supporting and moving the pipeline across a field to be irrigated.

Expensive and complicated transverse vehicles have been developed for moving a nonrotatable pipeline longitudinally as well as transversely. One of the principal objects of this invention is to provide a movable irrigation pipeline that has a drive mechanism that is inexpensive and simple to manufacture and efficient and economical to operate for moving the pipeline transversely across a field and for permitting the longitudinal movement of the pipeline by an exterior drive means.

A further object of this invention is to provide a drive mechanism for a movable pipeline that enables the operator to easily and safely pivot the wheels from transverse positions to longitudinal positions without having to operate a clutch in the drive mechanism.

Many farmers utilize pipelines that are over a thousand feet long. To transversely move such a pipeline it is necessary that each of the individual transverse vehicles is accurately aligned with one another to prevent overstressing of the pipeline. If one or several of the vehicles is misaligned undue bending forces may be applied to the pipeline resulting in structural damage.

One of the principal features of this invention is to provide a movable pipeline system that has fine angular adjustment features for accurately aligning each vehicle with the pipeline.

Another object of this invention is to provide a pipeline system that may be moved longitudinally and transversely that has fine adjustment features for accurately aligning the wheels of the vehicles so that the wheels are parallel to one another when the pipeline system is moved longitudinally or transversely.

To irrigate as large an area as possible at one setting it is often desirable to attach side tube or secondary lines to the main pipeline and extend the secondary lines to one side for distributing the water to a larger area. Problems have been encountered in attempting to move the pipeline with the secondary lines attached, as the secondary lines are supported in soft muddy soil. The drag created by the secondary lines is often sufficient to tip the vehicles over. Consequently, the farmer has to disconnect the secondary lines from the pipeline, move the pipeline to a new position, separately move the secondary lines to the new position and reconnect the secondary lines with the main pipeline. As a practical matter such a time consuming procedure overshadows the advantages of having secondary lines.

Pivot connections have been developed for connecting the secondary lines to the main pipeline so that the main pipeline may be moved forward slightly before the total static frictional force of the secondary lines is imposed on the pipeline. However, it is difficult to manufacture inexpensive pivot connections that will not leak. An additional feature of this invention is to provide a pipeline system that has simple, new and novel leak resistant expandable couplers for connecting the secondary lines to the main pipeline which permit the movement of the main pipeline forward before the static frictional forces of the secondary lines are applied to the pipeline.

A further object of my invention is to provide expandable connections between the main line and the secondary lines that prevent the rotation of the secondary lines about their axes.

Other objects of this invention will become apparent upon reading the description of a preferred embodiment of this invention.

BRIEF DESCRIPTION OF THE DRAWINGS

A preferred embodiment of this invention is shown in the accompanying drawings, in which:

FIG. 1 is a perspective view of a movable pipeline system that has a plurality of spaced transverse vehicles mounted along the main pipeline which incorporate many of the principal features of this invention;

FIG. 2 is a fragmentary side elevation view of a segment of the pipeline showing the vehicle wheels in a transverse position;

FIG. 3 is a fragmentary plan view of a section of the pipeline showing the vehicle wheels in a transverse position;

FIG. 4 is a fragmentary side elevation view similar to FIG. 2 except showing the wheels in a longitudinal position;

FIG. 5 is a fragmentary plan view similar to FIG. 3 except showing the vehicle wheels in a longitudinal position;

FIG. 6 is a fragmentary cross sectional view taken along line 6—6 in FIG. 3 showing the principal features of the drive mechanism for driving the vehicles;

FIG. 7 is a fragmentary cross sectional view taken along line 7—7 in FIG. 3 showing an expandable coupler connecting a secondary line to the main pipeline;

FIG. 8 is a fragmentary side elevation view showing part of the vehicle frame structure for supporting the pipeline with specific emphasis on an adjustment feature for angularly aligning the vehicles with the pipeline;

FIG. 9 is a fragmentary cross sectional view taken along line 9—9 in FIG. 8 showing the angular adjustment feature as viewed from underneath;

FIG. 10 is a fragmentary enlarged plan view of the wheel and axle assembly particularly emphasizing the adjustment feature for angularly aligning the wheels with respect to the frame.

FIG. 11 is a fragmentary plan view of a portion of a sprocket drive system for each vehicle with particular emphasis on an adjustment feature for axially aligning the vehicles:

FIG. 12 is a cross sectional view taken along lines 12—12 in FIG. 11 particularly emphasizing the spring biased pin connection utilized in the axial adjustment of the vehicles;

FIG. 13 is a fragmentary cross sectional view taken along line 13—13 in FIG. 11 showing a plan view of the spring pin connector;

FIG. 14 is a fragmentary cross sectional view taken along line 14—14 in FIG. 7 showing the expandible coupler; and FIG. 15 is a fragmentary cross sectional view taken along line 15—15 in FIG. 7 emphasizing particular elements of the expandable coupler.

DESCRIPTION OF THE PREFERRED EMBODIMENT

Referring now in detail to the drawing, there is shown in FIG. 1 a movable pipeline system that has an elongated main pipe line 10 that is elevated above the ground on a plurality of transverse vehicles 11 that are spaced along the pipeline at given intervals. Upright sprinkler heads 12 are affixed to the main pipeline for distributing the water under pressure to the soil in proximity with the main pipeline.

In order to increase the coverage of the pipeline system during each setting, side tubes or secondary lines 13 are connected to the main pipeline at spaced intervals for distributing the water over a large area. Upright sprinkler heads 14 are mounted on the secondary lines at given intervals for distributing the water along the secondary lines 13.

Each transverse vehicle 11 has a ⊥-shaped frame 16 that includes a horizontal member 17 that extends outward on both sides of the main pipeline. A pedestal member 18 is pisitioned midway between the ends of the horizontal members 17 and extends upward for supporting the main pipeline.

Axle bearings 20 are mounted to each end of the horizontal frame member 17 in a vertical orientation for supporting and permitting the rotation of the upright sections 21 of L-shaped axles 22. The horizontal sections 23 of the axles 22 extend outwardly for supporting wheels 24 and 25 positioned at opposite ends of each horizontal member 17. The wheels 24 and 25 on each transverse vehicle 11 are pivotable about vertical axes defined by the axle bearings 20.

Angular adjustment means interconnect the wheels 24 and 25 with the frame of each transverse vehicle to accurately align the wheels parallel to each other and to enable the wheels to be easily and safely pivoted from transverse positions to longitudinal positions. Each angular adjustment means includes a pivot arm 27 afixed to the upper end of the axle 22. An adjustment plate 28 is slidably mounted on the end of frame member 17 for pivotal movement about the vertical axis of the axle 22.

Securing means interconnect each adjustment plate 28 and an associated pivot arm 27 for securing the elements together at spaced angular positions. Specifically the securing means includes an aperture 30 formed in the adjustment plate 28 that defines a longitudinal location and an aperture 31 that is angularly spaced 90° from the aperture 30 that defines a transverse location. An alignment aperture 32 is formed near the end of each pivot arm 27 for receiving a T-shaped pin. The T-shaped pin 33 is inserted through the aperture 32 and one of the apertures 30 or 31 to secure the pivot arm 27 to the adjustment plate 28. When the T-shaped pin 33 is inserted through the aperture 30, the wheel is transversely positioned and when the T-shaped pin extends into the aperture 31 the wheel is longitudinally positioned.

A fine adjustment feature 34 interconnects the adjustment plate 28 and the end of horizontal member 17 for accurately aligning the wheels so that the wheels will be parallel with one another. The fine adjustment feature includes a tab 35 secured to the adjustment plate 28 and extending therefrom. Spaced lugs 36 straddle the tab 35 and are secured to the frame member 17. Opposing adjustment bolts or screws 37 are threaded through the lugs 36 for engaging the sides of the tab 35. Lock nuts 39 are mounted on the bolts 37 for preventing the rotation of the bolt 37 once the desired aligment is obtained.

Turning now to the connecting structure between the pedestal 18 and pipeline 10, FIG. 8 shows a longitudinal cradle 40 affixed to the underside of the pipeline 10 by circumferential bands 41 that secure the pipeline rigidly to the cradle 40. An A-shaped projection is affixed to each cradle 40 and extends upward, with the lugs straddling the main pipeline, to an elevation substantially above the pipeline. Suspension cables 43 and 44 are connected to the top of the A-shaped projection 42 and extend longitudinally to both sides of each vehicle 11 for connecting circumferential bands 45 that are spaced from the vehicle. The projection 42 and the cables 43 and 44 support the sections of the pipeline between the vehicles. This suspension system means that fewer transfer vehicles 11 are necessary to suport and move the pipeline 10. This reduces the cost of the irrigation equipment considerably.

A fine angular adjustment feature 48 interconnects the longitudinal cradle 40 and the corresponding pedestal 18 to accurately angulary align the transverse vehicle with the main pipeline so that each vehicle is parallel to the others. The fine adjustment feature prevents undue bending forces being applied to the main pipeline resulting from misalignment of the vehicles. The fine adjustment feature 48 includes a top bearing plate 50 that is secured to the longitudinal cradle 40. The top bearing plate 50 has a central aperture formed therein that is aligned with a central aperture of a bottom bearing plate 51. A center bolt 52 extends through the central apertures of the top and bottom bearing plates for defining the rotational axis and permitting rotational movement between the plates. A tab 53 is affixed to the bottom bearing plate 51 that extends outwardly therefrom. Lugs 54 are secured to the top bearing plate 50 straddling the tab 53. Adjustment bolts or screws 55 are threaded through the lugs 54 in opposing relationship for engaging the sides of the tab 53. By selectively rotating the bolts 55 the bottom bearing plate 51 may be rotated with respect to the top bearing plate to angularly align the vehicle with the main pipeline 10. Lock nuts 56 are mounted on the adjustment bolts 55 for preventing the rotation of the bolts once the desired alignment is obtained.

Locking means interconnect the top bearing plate and the bottom bearing plate for preventing rotational displacement of the plates 50 and 51 once they are angularly aligned. The locking means includes locking bolts 57 (FIG. 9) that extend through the plates 50 and 51 for preventing rotation therebetween.

The pipeline system has a drive means for moving the pipeline transversely across the field. The drive means includes a motor assembly that is mounted on one of the vehicles. A motor 58 (FIG. 6) is mounted on a horizontal bracket 60 secured to the vehicle frame. The motor drives a chain 62 (FIG. 6) that extends upwardly to a clutch and gear reduction unit 64. The output shaft of the unit 64 is connected to an idler shaft 65 by a chain 67 (FIG. 2). The idler shaft 65 is connected to a jack shaft 70 through a chain 71 (FIGS. 2 and 6). It is important that the drive system be balanced on the frame as evenly as possible on the frame in addition to not interfering with the movement of the wheels. Thus, the motor bracket 60 extends outward longitudinally between the wheels so that the motor does not interfere with the movement of the wheels. The drive chains 67 and 71 are on opposite sides of the pedestal 18 to balance the drive system.

The jack shaft 70 is supported by bearings 73 that are affixed along the pipeline. Each vehicle is driven by the jack shaft through sprockets 74 (FIGS. 2 and 3) that are affixed to the jack shaft adjacent each vehicle. A chain 75 connects the sprockets 74 with a large sprocket 76 (FIG. 6) that is rotatably mounted on a shaft 77. The shaft 77 is mounted on the frame member 17 intermediate one end of the frame member 17 and the pedestal 18. The shaft extends parallel with the main pipeline 10. A plate 78 is affixed to one end of the shaft 77 for connection with the sprocket 76. Angularly spaced apertures 80 are formed in the plate 78 for alignment with similar apertures formed in the sprocket 76. A spring biased pin 81 is attached to the plate 78 for insertion through the apertures 80 and the apertures in the sprocket 76 to lock the plate 78 with the sprocket 76 so that the sprocket 76 will rotate with the shaft 77. If one of the vehicles is axially misaligned with the others, the operator merely pulls the pin 81 and moves the vehicle into axial alignment and then reinserts the pin 81 to synchronize the vehicle drive systems. This feature may then be termed an axial alignment feature.

A smaller sprocket 82 is fixed to the shaft 77 immediately forward the sprocket 76 (FIG. 2). A wheel drive pinion 83 (FIG. 6) is affixed to the other end of the shaft 77 on the opposite side of the horizontal frame member 17. A chain 84 extends from the sprocket 82 to a sprocket 82 to a sprocket 85 that is mounted on a shaft 86. The shaft 86 is parallel with the shaft 77 and is positioned on the other side of the pedestal. A wheel drive gear pinion 90 is mounted on the other end of the shaft 86 on the same side of the horizontal frame member 17 as pinion 83.

An internal spur gear 91 is mounted to each wheel 24 concentrically about the wheel axis for engagement with the pinion 83 when the wheel is in the transverse position. An internal spur gear 92 is mounted on each wheel 25 concentrically about the wheel axis for engagement with the pinion 90. The spur gears 91 and 92 have diameters considerably less than that of the wheels to prevent the gears from becoming clogged with mud etc.

When it is desired to move the pipeline system transversely across the field from one position to another, the operator merely starts the motor 58 and then activates the clutch and speed reduction unit 64 to rotate the jack shaft 70. The jack shaft in turn drives the individual chains 75 to rotate the large sprockets 76. The rotation is transferred to the pinions 83 and 90 for rotating the wheels to transversely move the pipeline across the field.

If one or more of the vehicles 11 is axially misaligned with the other vehicles along the pipeline, the operator merely pulls the pin 81 out and manually moves the vehicle forward or back to axially align the vehicle. Then the operator inserts the pin 81 through an aperture 80 and corresponding aperture in the sprocket 76 to synchronize the drive system with the other vehicles.

The secondary lines 13 are connected to the main pipeline 10 at spaced intervals through branch pipes 93. The pipes 93 are rigidly secured to the pipeline 10 in a depending manner for connection with the secondary lines through expandable couplings 94.

Each expandable coupling 94 has a lost motion feature to enable the drive system to start the pipeline 10 moving before the static frictional forces of the secondary lines are applied to the drive systems.

Each expandable coupling 94 has four principal parts: a cylindrical fitting 95, a collar 96, a tube 94 and a flexible conduit 98.

Each fitting 95 fits over a corresponding branch pipe 93 enclosing an aperture 100 that is formed in the wall of the pipe 93. Spaced seals 101 are mounted in the fitting 95 for engaging the exterior of the pipe 93 to prevent water leakage and also to permit the rotation of the fitting 95 about the pipe 93. The fitting has a cylindrical cavity 102 formed in the inner surface thereof for permitting the flow of water through the apertures 100 and out a radial output 103 formed in the wall of the fitting. A snap ring 104 holds the fitting on the pipe 93.

An automatic drain valve 105 is mounted in the end of each branch 93 for draining the water from the main pipeline 10 through the branch pipes 93 when the pressure in the pipeline diminishes to a preset value. Each drain valve 105 includes a curved end plate 107 having an aperture therethrough. A rubber resilient plug 108 is positioned in the aperture for controlling the flow of water through the opening in the plate 107. When the lines are pressurized the head of the rubber plug is forced against the plate 107 to cover the aperture. When the pressure in the lines decreases to a preset value, the plug springs up to uncover the opening to permit the flow of water therethrough to drain the water from the pipeline 10.

The collar 96 is affixed to the fitting 95 and extends downward therefrom for slidably supporting the tube 97. The collar 96 has a multisided aperture 113 formed therein for receiving a corresponding multi-sided tube 97 to prevent the rotation of the tube about the tube axis. In the drawings (FIGS. 15 and 16) the aperture 113 is shown as a square opening and the tube 97 is shown with a square cross section. The tube 97 has two spaced shoulders 115 and 116 fixed thereon near the ends. The shoulders 115 and 116 permit the tube 97 to longitudinally move in the collar 96 in a lost motion manner until one of the shoulders engages the collar 96. Quick disconnectors are mounted on one end of the tube 97 for connection with a secondary line 13.

The flexible conduit 98 extends from the radial outlet 103 of the fitting 95 to the other end of the tube 97 to provide communication between the fitting 95 and the tube 97 and to permit the movement of the tube in the collar without interfering with the flow of the water from the main pipeline 10 to the secondary lines 13.

For many crops it is necessary to mount the sprinkler heads 14 substantially elevated from the ground in order to obtain a wide and even distribution of the water. When the heads 14 are elevated, a substantial bending moment is produced tending to rotate the secondary lines and tip the heads to one side. In this embodiment the bending moments are resisted by the non-rotatability of the tubes.

To move the pipeline with the secondary lines attached, the operator first moves the pipeline back slightly so that the shoulders 115 are not engaging the collars, thereby providing slack in the connections. The pipeline 10 is then moved forward to gain momentum before the static frictional forces of the secondary lines are felt by the drive system. As the pipeline moves forward the tubes 97 slide in the collar 96 until the shoulders 115 engage the collars. Not all of the tubes bottom out at the same instant, therefore the drive system is not required to overcome the static friction of all the secondary lines at once. This is similar to the system used in moving a long string of railroad cars in which the engine is first reversed to back the cars up to provide slack in the couplings between the cars. Then as the engine moves forward, the static frictional loads of the cars are overcome one at a time, thereby reducing the driving force required to move the train.

Because of this advantageous feature, it has been found that a motor of six horsepower is sufficient to drive the irrigation pipeline system disclosed in the drawings which is approximately a quarter of a mile long.

When it is desired to longitudinally move the pipeline from one field to another, the operator merely lifts the T-shaped pins 33 and moves the wheels to their longitudinal positions and then reinserts the T-shaped pin 33 into the apertures 31. As the wheels 24 and 25 move from their transverse positions, the internal spur gear 91 and 92 disengage with the pinions 83 and 90 respectively. It should be readily appreciated that it is quite easy and convenient to pivot the wheels from the transverse position to the longitudinal position. After all the wheels are aligned longitudinally with the pipeline, a tractor or the like is attached to the pipeline for moving the pipeline to another field. To start the process over again, the operator merely pivots the wheels 24 and 25 to their transverse positions to engage the internal spur gears 91 and 92 with their respective pinions 83 and 90.

It should be appreciated that the above described embodiment is simply illustrative of the principles of this invention. Numerous other embodiments may be readily devised that fall within the scope of this invention. Therefore, only the following claims are intended to define this invention.

What is claimed is:

1. In an apparatus for supporting and transversely moving a nonrotatable elongated irrigation pipeline, said apparatus includes:
   (a) a plurality of transverse support frames space along the pipeline for supporting the pipeline elevated from the ground in which:
   (b) each supporting frame has ground engaging wheels mounted on opposite sides of the pipeline for facilitating the transverse movement of the pipeline;
   (c) a powered rotating shaft extending along the pipeline; and
   (d) a power transmitting means interconnecting the wheels to transmit the power to the wheels to propel the frame, in combination with the improvement of;
   (e) a pedestal mounted on each frame for supporting a section of the pipeline;
   (f) an adjustable coupling interconnecting the pedestal and the pipeline for angularly positioning the frame with respect to the pipeline, said coupling comprising:
      (1) a bottom bearing plate affixed to the pedestal;
      (2) a cradle secured to the pipeline;
      (3) a top bearing plate affixed to the cradle and slidably engaging the bottom bearing bracket;
      (4) a tab secured to one of the bearing plates;
      (5) two spaced lugs secured to the other bearing plate straddling the tab;
      (6) opposing adjustment screws threaded to the lugs for engaging the tabe therebetween to angularly move one plate with respect to the other; and
      (7) locking means interconnecting the top and bottom plates to prevent angular displacement after the plates are angularly adjusted.

2. An apparatus for supporting and transversely moving a nonrotatable elongated irrigation pipeline and for enabling the pipeline to be moved longitudinally, said apparatus includes:
   (a) a plurality of transverse support frames spaced along the pipeline for supporting the pipeline elevated from the ground;
   (b) L-shaped wheel axles pivotally mounted to the ends of the frame with the upright section of the axles journalled in bearings affixed to the frame;
   (c) wheels rotatably mounted to the horizontal section of the axles in combination with the improvement of;
   (d) a horizontal pivot arm secured to the upright section of each arm for pivotal movement therewith;
   (e) a horizontal plate pivotally mounted about each upright axle section having two apertures formed therein angularly spaced 90° apart;
   (f) a pin extending through each pivot arm for insertion in the apertures to lock the pivot arm to the plate;
   (g) a tab affixed to each plate and extending therefrom;
   (h) two lugs affixed to each frame end straddling each tab;
   (i) opposing adjustment screws threaded through the lugs for engaging the tab therebetween to angularly align the plate so that when the pin is in one of the apertures the respective wheel in normal to the pipeline and when the pin is in the other apertures the wheel is parallel to the pipeline.

3. An apparatus for supporting and transversely moving a nonrotatable elongated irrigation pipeline and for enabling the pipeline to be moved longitudinally, said apparatus comprising:
   (a) a pluraliy of L-shaped transverse support frames spaced along the pipeline for supporting the pipeline elevated from the ground in which each of said transverse support frames has;
      (1) a horizontal frame member extending outwardly to both sides of the pipeline,
      (2) a vertical pedestal affixed to the horizontal frame member,
      (3) an adjustable coupling mounted on the pedestal interconnected with the pipeline for angularly positioning the transverse support frame with respect to the pipeline, and
      (4) ground engaging wheels moveably mounted on the horizontal frame member for pivotal movement about vertical axes from transverse positions to longitudinal positions;
   (b) a gear mounted concentrically on each wheel;
   (c) pinions rotatably mounted on the horizontal frame member spaced from the vertical pivot axes for engaging the wheel gears when the wheels are in the transverse positions;
   (d) a power rotating shaft extending along the pipeline; and
   (e) drive train means interconnecting the power rotating shaft and the pinions for rotating the wheels when the wheels are in the transverse positions to move the pipeline transversely across a field.

4. In the apparatus as defined in claim 3 wherein the vertical pedestal has an extension secured thereto that extends above the pipeline to serve as a column for attaching suspension cables that extend longitudinally for supporting the pipeline spaced from the transverse support frames.

5. In the apparatus as defined in claim 3 wherein the adjustable coupling comprises:
   (a) a bottom bearing plate affixed to the top of the pedestal;
   (b) a cradle secured to the pipeline;
   (c) a top bearing plate secured to the cradle engaging the bottom bearing plate;
   (d) an angular adjustment means interconnecting the bottom and top bearing plates for angularly adjusting the bottom bearing plate with respect to the top bearing plate; and
   (e) locking means interconnecting the top and bottom bearing plates for locking the plates together to prevent angular movement therebetween after the desired adjustment is made.

6. In the apparatus as defined in claim 5 wherein the angular adjustment means comprises:
   (a) a tab secured to one of the bearing plates and extending therefrom; and
   (b) diametrically opposing adjustment screws threadably mounted through lugs secured to the other bearing plate for engaging the tab therebetween to adjust the angular relationship of the bearing plates.

7. In the apparatus as defined in claim 3 wherein the wheels are rotatably mounted on the horizontal sections of L-shaped axles with the vertical sections of the axles journalled in bearings mounted to the ends of the frame to permit pivotal movement of the wheels and further comprising the improvement of:
   (a) a pivot arm affixed to each vertical axle section for swinging in an arcuate path when the wheels are pivoted;
   (b) an alignment plate pivotally mounted about each vertical axle section for slidable movement on a frame end;
   (c) securing means interconnecting each plate and pivot arm for securing the arm to the plate at two angularly displaced positions that are spaced 90° from each other;
   (d) an angular adjustment means interconnecting each alignment plate and the frame end for angularly adjusting the plate about the vertical axle section so that when the pivot arm is secured to the plate in one angular position the respective wheel is parallel to the pipeline and when the pivot arm is secured to the plate at the other angular position the respective wheel is normal to the pipeline.

8. In the apparatus as defined in claim 7 wherein the securing means includes:
(a) a first aperture formed in each plate at a transverse position;
(b) a second aperture formed in each plate at a longitudinal position that is angulary spaced 90° from the first aperture; and
(c) a position pin mounted on each pivot arm for being inserted into the apertures to secure the pivot arm to the plate at the two angularly displaced positions and wherein further the angular adjustment means includes:
(d) a tab secured to each plate and extending therefrom for movement therewith;
(e) two spaced lugs secured to each end of the frame straddling the tab and
(f) opposing adjustment screws threaded to the lugs for engaging the tab therebetween to adjust the angular position of the plate.

9. In an apparatus for supporting and transversely moving a nonrotatable elongated irrigation pipeline, including:
(a) a plurality of transverse support vehicles spaced along the pipeline for supporting the pipe and for transversely moving the pipeline;
(b) a powered rotatable shaft extending along the pipeline for driving the individual vehicles;
(c) a plurality of branch pipes extending downwardly from the pipeline for communication with
(d) side tube irrigation lines extending transversely to the pipeline for irrigating an area to the side of the pipeline, in combination with improved expandable couplers interconnecting the branch pipes and the side tube lines, each of said expandable couplers comprising:
(e) a fitting mounted to the end of each branch pipe having a fluid outlet formed therein;
(f) a collar affixed to each fitting and extending therefrom;
(g) a tube slidably mounted in each collar with one end connected to and communicating with a side tube line; and
(h) a flexible conduit connected between the fluid outlet of the fitting and the other end of the tube for communicating fluid therebetween.

10. In the apparatus as defined in claim 9 wherein shoulders are formed on the tube for abutting the collar to limit the movement of the tube in the collar.

11. In the apparatus as defined in claim 9 wherein the collar has a multi-sided aperture formed therein for receiving a corresponding multisided tube therein to prevent the rotation of the tube with respect to the collar.

12. In the apparatus as defined in claim 9 wherein each of the branch pipes has an aperture formed in the wall thereof and wherein each of the fittings enclose the aperture.

13. In the apparatus as defined in claim 12 wherein a pressure sensitive drain valve is mounted in the end of each branch pipe that opens when the pressure in the branch pipe is below a preset valve to automatically drain the main pipe line and branch pipe.

14. In the apparatus defined in claim 12 wherein the fitting is rotatable about the branch pipe to permit angular movement of the respective side tube line.

References Cited

UNITED STATES PATENTS

| 1,429,756 | 9/1922 | Mitchell | 239—213 |
| 2,854,259 | 9/1958 | Clark | 137—614.03 |
| 3,286,723 | 11/1966 | Purtell | 137—344 |
| 3,353,751 | 11/1967 | Dowd | 239—212 XR |
| 3,355,109 | 11/1967 | Kane | 137—344 XR |
| 3,360,200 | 12/1967 | Purtell | 137—344 XR |
| 3,361,360 | 1/1968 | Purtell | 239—213 XR |

FOREIGN PATENTS

| 248,510 | 12/1963 | Australia. |

SAMUEL SCOTT, Primary Examiner

U.S. Cl. X.R.
239—212, 213